G. RISCHMULLER.
CLUTCH AND SPEED REGULATOR.
APPLICATION FILED MAR. 5, 1912.

1,089,498. Patented Mar. 10, 1914.
2 SHEETS—SHEET 1.

WITNESSES
F. C. Fliedner
N. B. Keating

INVENTOR
George Rischmuller
BY
F. M. Wright,
ATTORNEY

UNITED STATES PATENT OFFICE.

GEORGE RISCHMULLER, OF SAN FRANCISCO, CALIFORNIA.

CLUTCH AND SPEED-REGULATOR.

1,089,498.  Specification of Letters Patent.  Patented Mar. 10, 1914.

Application filed March 5, 1912. Serial No. 681,707.

*To all whom it may concern:*

Be it known that I, GEORGE RISCHMULLER, a citizen of the United States, residing at San Francisco, in the county of San Francisco and State of California, have invented new and useful Improvements in Clutches and Speed-Regulators, of which the following is a specification.

The object of the present invention is to provide a clutch for connecting a driving with a driven shaft which will also serve as a regulator for the speed of a shaft driven by a uniformly rotating driving shaft.

A further object is to provide a device of this character which will operate without friction and be practically noiseless.

Further objects are to provide such a device which will be very efficient and one in which the parts exposed to wear will be readily accessible for the purpose of observation and replacement.

I have herein shown my invention as used when applied for connecting the driving and driven shafts of a self-propelled vehicle, but it is obvious that the invention may be applied for connecting driving and driven shafts of all kinds.

Figure 1:
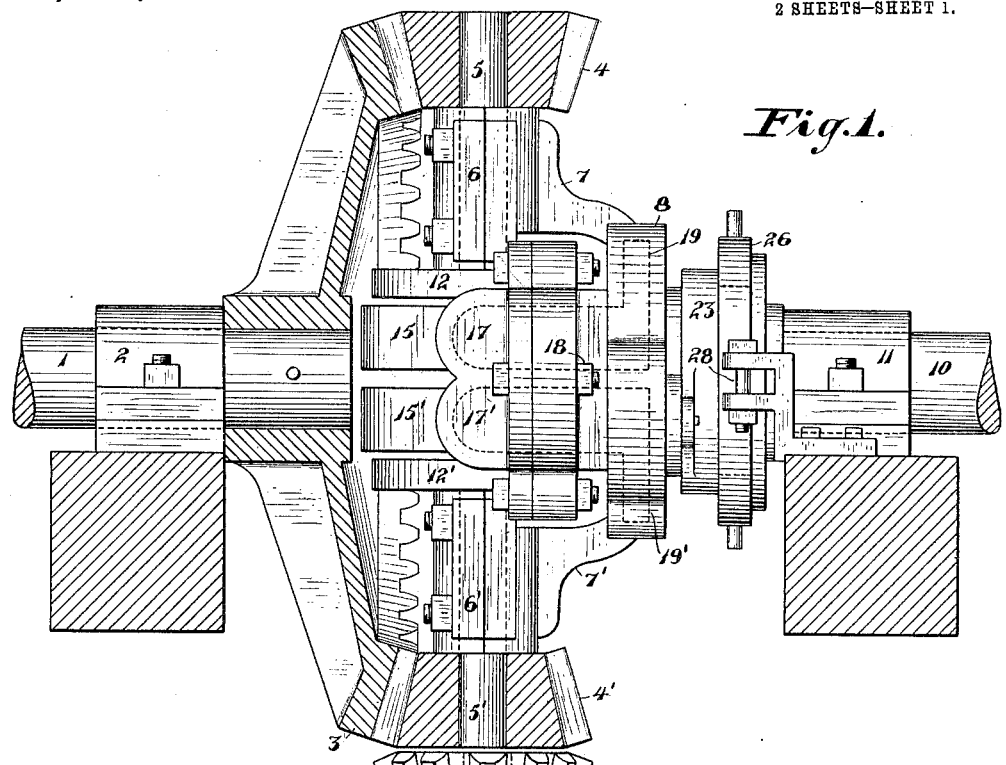
Figure 2:
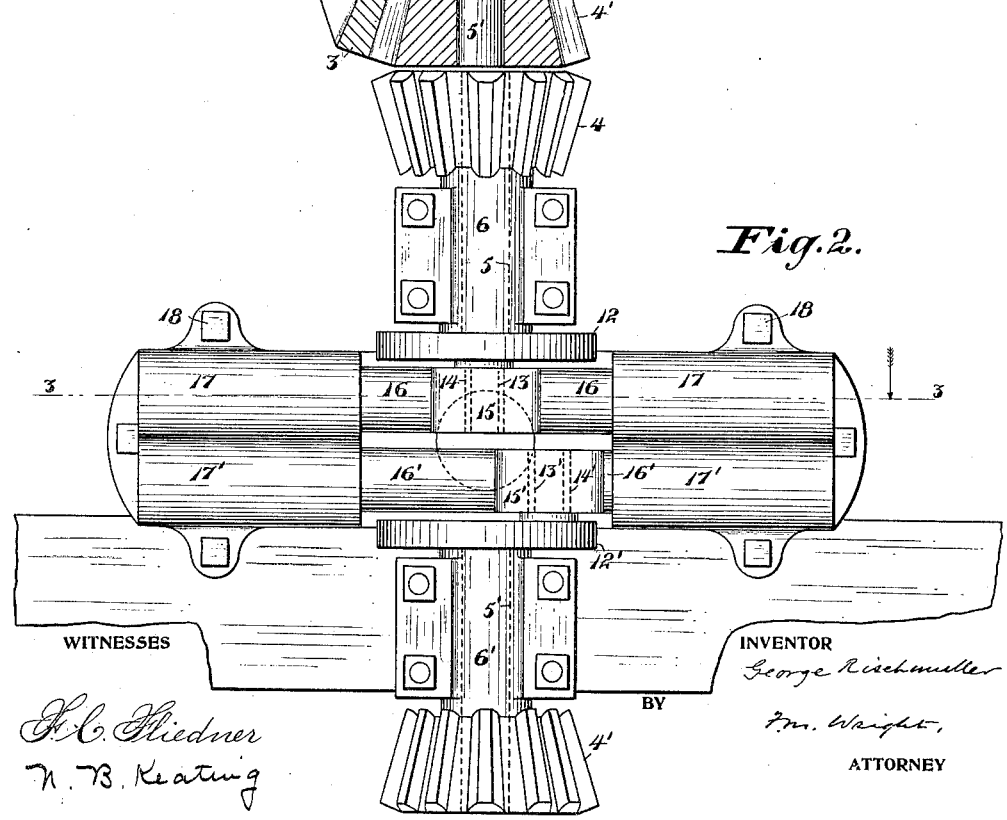
Figure 3:
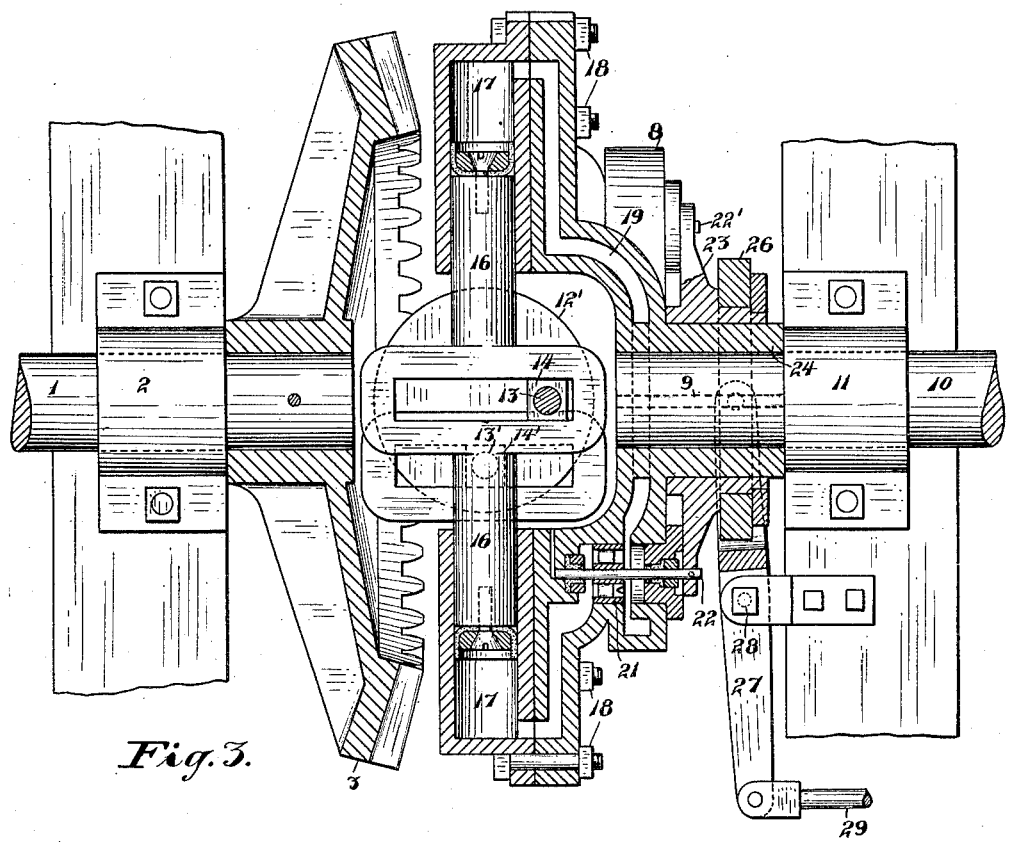
Figure 4:
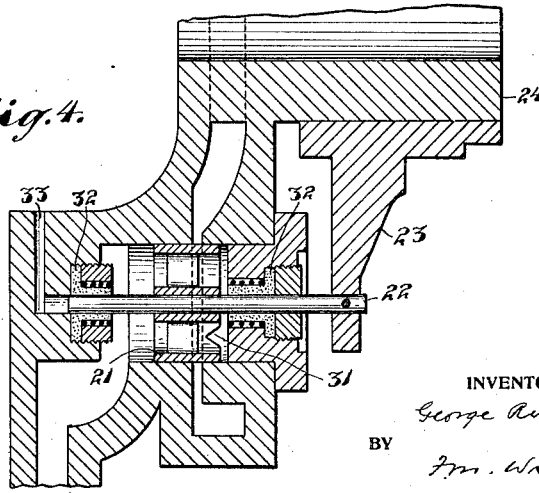

In the accompanying drawing, Figure 1 is a vertical section of the clutch, certain parts being shown in side elevation; Fig. 2 is a front view of the clutch, the driving shaft and gear wheel connected thereto being omitted; Fig. 3 is a horizontal section of the same, on the line 3—3 of Fig. 2; Fig. 4 is a detail sectional view of a valve.

Referring to the drawing, 1 indicates a driving shaft supported partly in a suitable bearing 2, and carrying pinned upon its rear end a bevel gear wheel 3. Said bevel gear wheel 3 meshes with two diametrically opposite bevel pinions 4, 4', on vertical shafts 5, 5', in alinement with each other and journaled in bearings 6, 6', supported by arms 7, 7', formed integral with, and extending from, a hollow casting 8, hereinafter more particularly described, and which is keyed, as shown at 9, to a driven shaft 10 having a bearing 11. The opposing ends of said shafts 5, 5', are formed integral with upper and lower disks 12, 12' which carry crank pins 13, 13', which enter blocks 14, 14', which can slide in upper and lower yokes 15, 15' formed integral respectively with pairs of pistons 16 and 16', the pistons of each pair being in line with one another and on opposite sides of the corresponding yoke. Said pairs of pistons can reciprocate in two pairs of cylinders 17, 17', said cylinders 17 and 17' on one side of the yokes being formed in one piece and likewise those on the other side, said pieces being bolted, as shown at 18, to said casting 8, the cylinders 17, 17', lying on opposite sides of a plane through the axis of the shaft 10. The cylinders 17 can communicate with one another by a conduit 19 formed in the casting 8 and connected with the outer ends of the cylinders and passing above the shaft 10, and in like manner the cylinders 17' can communicate with one another by a similar conduit 19' in the casting 8 passing below the shaft 10. These conduits 19, 19' are filled with a suitable liquid, such as a mixture of glycerin and alcohol. Said conduits are controlled respectively by valves 21, 21', actuated by valve stems 22, 22', which are connected to a ring 23 surrounding a hub 24 of the casting 8 and slidable upon said hub by means of a collar 26 in a circular groove in said ring, said collar 26 being pivotally connected to the forked end of a lever 27, fulcrumed, as shown at 28, upon a suitable support, the outer end of said lever being connected to a suitable rod 29 or other connection for operating the same. It will be observed that, by this arrangement, the valves 21, 21' can be freely moved to close or open the conduits while the casting 8, and all the parts connected therewith, are rotating at a high speed.

The following is the mode of operation of my improved clutch and speed regulator: When the driven shaft is at rest and the driving shaft is set in rotation, said rotation produces a corresponding rotation in opposite directions of the two bevel pinions 4, 4'. A corresponding rotation in opposite directions is consequently produced of the two disks 12, 12', and a reciprocation of the upper and lower pairs of pistons 16, 16'. If the valves 21, 21', controlling the conduits 19, 19', are open, the only effect of this reciprocation will be to pump liquid through said conduits and back again as the pistons reciprocate, and no motion is imparted to the casting 8 or to the driven shaft; but if the valves 21, 21' are closed, so that said liquid cannot flow along the conduits 19, 19', then reciprocation of said pistons is prevented, and consequently the bevel pinions 4, 4', are, in effect, rigidly connected to the shaft 10, and since the bevel pinions cannot rotate upon their shafts and they are in mesh with the bevel gear wheel 3, they must revolve with said bevel gear as if rigidly connected thereto, and consequently also the shaft 10 rotates as if rigidly connected to the driving shaft 3.

It is obvious that by opening the valves to such slight extent as to permit some movement of the liquid therein, while preventing free movement thereof, part only of the rotation of the driving shaft will be imparted to the driven shaft, that is, it will be rotated at a slow speed, which speed may be varied by variably opening the valves 21, 21'.

It will be observed that the yokes and crank pins are so arranged that at no time in their cyclical movement are they both on the dead center, thus obtaining a sufficiently uniform pressure in the conduits even when the valves are closed.

The object of providing two pairs of cylinders and plungers instead of only a single pair is in order that the parts may be at all times in perfect balance, so that there may be no disagreeable or dangerous oscillation.

As clearly shown in Fig. 4, the upper edges of the valves 21, 21' are formed with a notch 31 which will permit of a small amount of liquid only moving past said valve, when it is desired that the driven shaft be rotated at a low speed. The valve stems 22, 22' are carefully packed, as shown at 32, to prevent leakage, and conduits 33 are provided for the air passing to or from the ends of said stems.

I claim:—

1. The combination of two shafts in line with each other, a rotary device secured on one of said shafts, an element secured upon the other shaft having a liquid conduit therein, a valve for regulating the flow of liquid in said conduit, cylinders connected with the respective ends of the conduit, plungers in said cylinders, means directly connecting said plungers with each other, whereby they reciprocate in unison therein, a bearing carried by said element, a transverse shaft therein, one portion of said shaft being operatively connected to said plungers whereby the plungers reciprocate in unison with the rotation of the shaft, and a rotary device carried by another portion of the shaft and adapted to engage the rotary device on the first named shaft to revolve therewith.

2. The combination of two shafts in line with each other, a gear wheel secured on one of said shafts, an element secured upon the other shaft having a liquid conduit therein, a valve for regulating the flow of liquid in said conduit, cylinders connected with the respective ends of the conduit, plungers in said cylinders, means directly connecting said plungers with each other, whereby they reciprocate in unison therein, a bearing carried by said element, a transverse shaft therein, one portion of said shaft being operatively connected to said plungers whereby the plungers reciprocate in unison with the rotation of the shaft, and a pinion carried by another portion of the shaft and meshing with said gear wheel.

3. The combination of two shafts in line with each other, a bevel gear wheel secured to one of said shafts, an element secured to the other shaft having liquid conduits, on opposite sides of a plane through the axis of the shaft, valves for controlling the passage of liquid in said conduits, two pairs of cylinders on opposite sides of said plate, the cylinders of each pair being connected with the respective ends of the corresponding conduit, two pairs of plungers in said cylinders, shafts transverse to the aforesaid shafts and in line with each other, bearings for said transverse shafts, carried by said element, one end of each transverse shaft being operatively connected to a pair of plungers, whereby they reciprocate in unison with the rotation of said shaft, a bevel pinion carried by the other end of each transverse shaft, said bevel pinions meshing with said bevel gear wheel.

4. The combination of two shafts in line with each other, a bevel gear wheel connected to one of said shafts, a casting connected to the other shaft and formed with liquid conduits, valves controlling said conduits, two pairs of cylinders secured to said casting, the cylinders of each pair being in line with each other, and communicating at their ends with the respective ends of one of said conduits, two pairs of plungers in said cylinders, yokes each connected on opposite sides to the plungers of one of said pairs, transverse shafts in line with each other, said castings being provided with bearings for said shafts, a disk secured upon the inner end of each transverse shaft, a crank pin on each disk sliding in one of said yokes, and bevel pinions on the outer ends of said shafts, meshing with said gear wheel.

5. The combination of two shafts in line with each other, a bevel gear wheel connected to one of said shafts, a casting connected to the other shaft and formed with liquid conduits, valves controlling said conduits, a ring surrounding said casting, and operatively connecting the stems of said valves to open or close the same, said ring being grooved, and means engaging said groove for moving said ring to operate the valves, two pairs of cylinders secured to said casting, the cylinders of each pair being in line with each other, and communicating at their ends with the respective ends of one of said conduits, two pairs of plungers in said cylinders, yokes each connected on opposite sides of the plungers of one of said pairs, transverse shafts in line with each other, said castings being provided with bearings for said shafts, a disk secured upon the inner end of each transverse shaft, a crank pin on each disk sliding in one of said yokes, and bevel pinions on the outer ends of said shafts, meshing with said gear wheel.

In testimony whereof I have hereunto set my hand in the presence of two subscribing witnesses.

GEORGE RISCHMULLER.

Witnesses:
F. M. WRIGHT,
D. B. RICHARDS.

Copies of this patent may be obtained for five cents each, by addressing the "Commissioner of Patents, Washington, D. C."